Patented Oct. 26, 1954

2,692,876

UNITED STATES PATENT OFFICE 2,692,876

PHOSPHATES OF STYRENE-EPOXY COMPOUND COPOLYMERS

Martin E. Cupery, Wilmington, Del., assignor to E. I. du Pont de Nemours and Company, Wilmington, Del., a corporation of Delaware No Drawing. Application June 9, 1953, Serial No. 360,601

13 Claims. (Cl. 260—86.7)

This invention relates to a new class of polymeric materials and to their preparation. More particularly, this invention relates to copolymers containing phosphoric acid ester side groups and to coating compositions comprising these copolymers.

This application is a continuation-in-part of my copending application Serial No. 257,667, filed November 21, 1951, which latter application is a continuation-in-part of my application Serial No. 218,885, filed April 2, 1951, both now abandoned.

The starting materials for the polymers of this invention are certain polymeric epoxides, that is, polymers containing a plurality of epoxy groups;

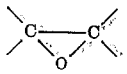

also called oxirane groups. The epoxy polymers used in this invention are the copolymers of styrene with polymerizable, ethylenically unsaturated epoxy monomers.

It is an object of this invention to provide novel polymeric materials and a method for their preparation. A further object is to provide a new class of copolymers containing phosphoric acid ester side groups. Another object is to provide coating compositions comprising the new polymeric products of this invention as film-forming materials. Other objects will appear hereinafter.

The objects of this invention are accomplished by providing new polymeric phosphates and their salts, the polymeric phosphates being the reaction products of a polymeric epoxide copolymer and phosphoric acid in amounts of at least 0.5 mole per oxirane oxygen atom in said copolymer, said polymeric epoxide copolymer containing from 35 to 98% by weight of polymerized styrene monomer, i. e., polymerized styrene or polymerized methylstyrene, and from 2 to 65% by weight of a polymerized ethylenically unsaturated epoxy monomer.

The structure of the polymeric phosphates of this invention is not known with certainty but it is believed that in all cases these products are linear, or substantially linear, polymers containing as lateral substituents phosphoric acid ester groups;

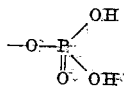

resulting from the opening of the epoxy groups according to the following scheme:

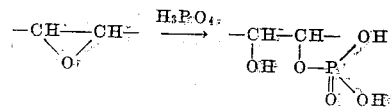

While the starting materials for the polyphosphates of this invention include copolymers of unsaturated epoxides with either styrene or methylstyrene (vinyl toluene), these copolymers will frequently be referred to simply as styrene copolymers, for the sake of brevity.

It has been found that by reacting certain styrene/unsaturated epoxide copolymers with phosphoric acid under the conditions described below, polymeric phosphates are obtained which are highly useful in a number of technological applications. Some of these polymeric phosphates are soluble in dilute aqueous alkali or ammonium hydroxide. Others are not soluble in alkaline solutions but are soluble in organic solvents. These polymeric phosphates are converted to crosslinked materials, infusible and insoluble in aqueous or organic media, by heating under appropriate conditions.

The polymeric phosphates of this invention are conveniently prepared by treating a solution of a polymeric epoxide of the type defined above at about 20% solids in an inert solvent with phosphoric acid at a temperature in the range of 50 to 100° C. for a period of one-half to three hours or at ordinary temperature of 20–25° C. for a longer period of about 15–25 hours. As already stated, there should be used at least 0.5 mole of phosphoric acid per oxirane oxygen. Under such conditions, little or no crosslinking takes place between the polymer molecules. The product is a polymeric acidic material which, depending partly upon the amount of styrene present in the starting polymer, may or may not be soluble in aqueous alkali.

The polyphosphates prepared from copolymers containing above about 70% by weight of polymerized styrene are in general alkali-insoluble, although they are soluble in organic solvents. Those prepared from copolymers containing 35–70% of polymerized styrene are soluble in dilute alkali or ammonium hydroxde, and may even be soluble in water. Partial or complete neutralization of polyphosphates of the latter group with alkali metal hydroxides, ammonia or an amine; e. g., an alkylamine of 1 to 4 carbon atoms, gives the alkali, ammonium or substituted ammonium salts, which are water soluble. However, the extent of phosphation, i. e., the amount of phosphate groups present in the polymer, also influences the alkali-solubility, in that the highly phosphated polymers are more alkali-soluble than those containing fewer phosphate groups, other things being equal.

The invention is illustrated in greater detail by the following examples, in which parts are by weight.

Example I

To a solution of 2 parts of benzoyl peroxide in 200 parts of allyl glycidyl ether heated at 90° C. was added at a uniform rate over a period of 2.5 hours a solution of 2 parts of benzoyl peroxide in 200 parts of styrene, after which the mixture was heated for an additional 1.5 hours at 90° C. The unreacted monomers were removed by heating the mixture at 70° C. under a reduced pressure of 0.1 mm. The residue was a styrene/allyl glycidyl ether copolymer containing 0.9% oxirane oxygen. This corresponds to 6.4% allyl glycidyl ether content, or a mole ratio of styrene to allyl glycidyl ether of about 16 to 1.

To a solution of 22.5 parts of the above copolymer in 42.5 parts of dioxane was added a solution of 12 parts of 85% orthophosphoric acid in 20 parts of dioxane, and the reaction mixture was heated at 80–90° C. for 1.3 hours. The resulting polyphosphate was isolated by pouring the solution in water. It was obtained, after washing with water and drying, as a resinous solid which was insoluble in dilute aqueous alkaline solutions but soluble in organic solvents such as dioxane, methyl ethyl ketone and benzene. Films cast from these solutions and cured at 150° C. were insoluble in all common organic solvents and had excellent hardness, toughness and mar resistance.

Example II

A solution of 125 parts styrene, 125 parts allyl glycidyl ether and 15 parts di-tertiary butyl peroxide was added slowly and continuously over a period of about one hour to 250 parts of allyl glycidyl ether in a closed vessel held at reflux temperature. When all was added, the solution was heated for an additional 2.5 hours. The residual monomers were removed by distillation under reduced pressure of less than 1 mm. mercury. There remained 207.5 parts of a soft, resinous product which was highly soluble in solvents such as acetone, dioxane, benzene and xylene but insoluble in water. A 50% solution of this polymer in xylene had a viscosity of 0.14 poise. Calculation based on recovery of the monomers indicated that the copolymer contained about 38% by weight of allyl glycidyl ether and 62% by weight of styrene.

To a solution of 6 parts of the above copolymer in 24 parts of dioxane was added 5 parts of 85% orthophosphoric acid and the solution was heated at 65–75° C. for one hour. The reaction product was dispersible in water but precipitated upon the addition of enough sodium chloride to give a total concentration of 5% sodium chloride. After washing several times with sodium chloride solution to remove the excess phosphoric acid, the product was washed with a low amount of water to remove the sodium chloride. The residual polymer was soluble in water. The solubility in water was increased greatly by the addition of a low amount of ammonia or allyl amines. Films obtained from such solutions were clear, hard and somewhat brittle. Such films showed excellent adhesion to glass, metal and wood surfaces.

Example III

A solution of 75 parts styrene, 50 parts acrylonitrile, 125 parts allyl glycidyl ether and 15 parts ditertiary butyl peroxide was added at a uniform rate over a period of 1.25 hours to 250 parts of allyl glycidyl ether held at reflux temperature in a closed vessel. After all was added the reaction solution was heated for an additional period of 1.25 hours. The residual monomers were removed under reduced pressure of less than 1 mm. mercury. There remained 225 parts of a soft resinous polymer which contained 5.73% oxirane oxygen and 5.43% nitrogen (Kjeldahl). From these values, the copolymer had a calculated composition of 40.8% allyl glycidyl ether, 20.6% acrylonitrile and 38.6% styrene. A 50% solution of the copolymer in a 1/1 xylene/methyl isobutyl ketone mixture had a viscosity of 0.4 poise.

To a solution of 5 parts of the above copolymer in 20 parts dioxane was added 4 parts of 85% orthophosphoric acid and the solution was heated at 60–70° C. for one hour. The product was dispersible in water but coagulated readily in 5 to 10% aqueous sodium chloride solution. Films obtained from aqueous sodium chloride solutions of the above polymeric phosphate were colorless, clear, hard and brittle.

Example IV

A mixture of 100 parts of styrene, 100 parts of allyl glycidyl ether and 1 part of di-tertiary butyl peroxide was heated to reflux. Additional portions of 1 part each of di-tertiary butyl peroxide were added after 1 hour and 2 hours refluxing, respectively. After 4.5 hours, about 100 parts of di-(2-ethoxyethyl) ether was added to reduce the viscosity of the reaction product and permit removal of the unchanged monomers by distillation, which was continued until the still head temperature reached the boiling point of di-(2-ethoxyethyl) ether. The solution was then poured into methanol and the precipitated polymer was washed repeatedly in methanol and dried. There was obtained 112 parts of styrene/allyl glycidyl ether copolymer containing 1.47% oxirane oxygen, corresponding to 10.5% by weight of polymerized allyl glycidyl ether. A 25% solution of this polymer in dioxane had a viscosity of 0.18 poise.

To a solution of 40 parts of the above polymeric epoxide in 160 parts of dioxane was added a solution of 17 parts of 85% orthophosphoric acid in 48 parts of dioxane, and the mixture was heated at about 90° C. for five hours. The resulting polymeric phosphate was precipitated by addition of water, washed with water and dried. This polymer, which had a viscosity of 0.14 poise in 15% concentration in dioxane, was only very slightly soluble in dilute aqueous ammonium hydroxide. It was readily soluble in organic solvents such as ethanol, acetone, dioxane, benzene and xylene. Films cast from organic solvent solutions on plain steel or phosphatized steel, after curing at 204° C. for 30 minutes, have excellent adhesion and toughness and high mar resistance. These films are insensitive to water, dilute aqueous alkali and dilute aqueous acids. They are greatly superior in adhesion and toughness to films from unmodified polystyrene or copolymers of styrene with methyl methacrylate, ethyl acrylate, allyloxy ethyl acrylate or similar monomers, and to films from the starting copolymer, i. e., the styrene/allyl glycidyl ether copolymer prior to treatment with phosphoric acid.

Example V

A mixture of 20 parts of allyl glycidyl ether, 80 parts of styrene, and 0.5 part of di-tertiary butyl peroxide was heated to reflux. After 2 hours heating, the highly viscous mixture was dissolved in benzene, and the solution was poured into methanol. The precipitated polymer was redissolved and reprecipitated twice to remove the unreacted monomers, then dried under reduced pressure. There was obtained 73 parts of a styrene/allyl glycidyl ether copolymer containing 0.27% oxirane oxygen, corresponding to 1.92% by weight of polymerized allyl glycidyl ether. A 40% solution of this polymer in toluene had a viscosity of 2.38 poises.

This copolymer was treated with phosphoric acid under the conditions and with the amounts described in Example IV. There was obtained 38 parts of a polymeric phosphate having a viscosity of 0.75 poise in 25% concentration in dioxane. This polyphosphate was insoluble in dilute alkaline solutions but soluble in organic solvents. Films cast from organic solutions and cured at 204° C. for 30 minutes were insoluble in organic solvents, had excellent adhesion to metals and were completely unchanged after two weeks' exposure to a 1.5% soap solution at 71° C.

Example VI

Myrcene monoepoxide (2-methyl-2,3-epoxy-6-methylene-7-octene,

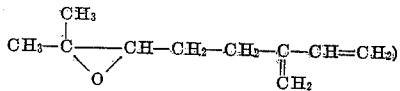

was prepared by treating a mixture of 2 moles of commercial myrcene and 4.8 moles of sodium bicarbonate in benzene with a solution of 1.5 moles of peracetic acid in 2.85 moles of acetic acid at 0-5° C. Myrcene monoepoxide boils at 87-90° C. at 18 mm. pressure. Its structure is confirmed by the fact that its ultraviolet absorption curve shows a strong absorption at 2250 Å, which is characteristic of a butadiene structure.

A solution of 6 parts of myrcene monoepoxide, 14 parts of styrene and 0.5 part of benzoyl peroxide in 80 parts of benzene was heated for 4 hours at 73-85° C., then poured into methanol containing a little petroleum ether. The precipitated polymer was washed with methanol and dried under reduced pressure. There was obtained 5.9 parts of a styrene/myrcene monoepoxide copolymer containing 2.6% oxirane oxygen, corresponding to 24.7% by weight of polymerized myrcene monoepoxide.

A solution of 0.5 part of the above copolymer in 10 parts of dioxane was treated with 0.38 part of 85% orthophosphoric acid, allowed to stand at room temperature for 2 days, then heated for 5 hours at 90-100° C. The resulting polymeric phosphate was isolated by addition of water and washing with water. It was a resinous solid insoluble in dilute aqueous ammonium hydroxide, but soluble in the common organic solvents.

Example VII

To a mixture of 14.2 parts of glycidyl methacrylate, 104 parts of styrene and 100 parts of methyl ethyl ketone maintained at reflux temperature was added over a period of 4 hours a solution of 2.2 parts of benzoyl peroxide in 100 parts of methyl ethyl ketone. After refluxing the mixture for an additional 3 hours, there was obtained a solution of a styrene/glycidyl methacrylate copolymer containing about 88% styrene. Without isolating the polymer, the solution was cooled, diluted with 76 parts of methyl ethyl ketone and treated while mixing rapidly with 11.5 parts of 85% orthophosphoric acid. After one hour at room temperature the solution was heated at reflux temperature for one hour, then the solvent was removed by distillation, first at atmospheric pressure and finally under reduced pressure of 20 mm. To the residual product was added 130 parts of xylene, yielding a viscous solution containing about 50% of polymer solids. This solution was completely stable on prolonged storage. The polymeric phosphate had an acid number of 111 using phenolphthalein indicator in xylene-ethanol solution.

Films of the above polyphosphate cast on steel panels and baked at 204° C. for 20 minutes were insoluble in xylene, had excellent color and toughness and high hardness (about 3H on the pencil hardness scale). The films had good adhesion and good flexibility in standard impact resistance tests.

Example VIII

A mixture of 2000 parts of styrene, 400 parts of allyl glycidyl ether and 60 parts of di-tertiary butyl peroxide was added over a period of 7 hours to 1200 parts of allyl glycidyl ether held at 130-133° C., then the reaction mixture was heated for an additional 5 hours at 130° C. The conversion of monomers to polymer was 68%. The unchanged monomers were removed under 15-20 mm. pressure by heating at 100-120° C. To the residue was added 250 parts of aromatic hydrocarbon solvent (B. P. 150-180° C.) and the evaporation was repeated to remove the final traces of monomers and solvent. The resulting styrene/allyl glycidyl ether copolymer contained 13.2% by weight of allyl glycidyl ether.

To a solution of 1000 parts of this copolymer in 2333 parts of methyl ethyl ketone was added rapidly with stirring 133 parts of 85% orthophosphoric acid. After about one hour at room temperature the solution was heated to reflux (80° C.) and held at that temperature for one hour. The solvent was removed by distillation, finally at reduced pressure, and the residual polyphosphate was dissolved in toluene to give a solution which, at about 33% solids, had a viscosity of about 20 poises. The polyphosphate had an acid number of 103, using phenolphthalein indicator in toluene-ethanol solution.

Films of this polyphosphate on steel panels were cured at 177° C. for 30 minutes. These films had excellent hardness (4H to 7H on pencil hardness scale), good adhesion and flexibility, outstanding resistance to conditions of high humidity, and complete inertness upon prolonged exposure to lubricating oils and greases. Pigmented compositions, containing 80 parts of titanium oxide to 100 parts of polyphosphate and cured at 177° C. for 30 minutes, had good gloss, excellent hardness and high mar resistance. Such compositions at 2 mil thickness on steel panels, cured at 177° C. for 30 minutes, gave complete protection against rusting after exposure to 100% relative humidity at 71° C. for a period of two months. They also showed complete resistance to the action of grease after several months' exposure. They further showed no visible change after 1000 hours' exposure to ultraviolet light.

Example IX

A mixture of 700 parts of styrene, 300 parts of ethyl acrylate, 200 parts of allyl glycidyl ether and 30 parts of benzoyl peroxide was added over a period of 2 hours to 600 parts of allyl glycidyl ether held at a temperature of 130° C. The conversion of monomers to polymer was 77.8%. The unreacted monomers were removed by distillation under reduced pressure, the residual styrene/ethyl acrylate/allyl glycidyl ether copolymer was treated with 300 parts of aromatic hydrocarbon solvent (b. p. 150–180° C.) and the remaining monomers and solvent were again evaporated under reduced pressure. To the residual material was added methyl ethyl ketone to yield a solution containing 52.7% by weight of copolymer. This copolymer contained 27.8% of polymerized allyl glycidyl ether.

To 1209 parts of the above polymer solution containing 52.7% solids was added 953 parts of methyl ethyl ketone and 178 parts of 85% orthophosphoric acid and this solution was heated at 80° C. for one hour.

Films of the resulting polyphosphate, obtained by evaporation of the solution, had excellent adhesion to substrates such as plain steel or other metal surfaces. Such coatings are useful as undercoats for other coating compositions which normally have low adhesion to metal surfaces. Maximum adhesion of the polyphosphate is obtained by curing at 120–180° C. Such cured coatings, clear or pigmented, have excellent adhesion, flexibility and mar resistance and high resistance to prolonged exposure to water.

Example X

A mixture of 1000 parts of styrene, 200 parts of allyl glycidyl ether and 30 parts of azodiisobutyronitrile was added at a uniform rate over a period of 4 hours to a mixture of 600 parts of allyl glycidyl ether and 600 parts of allyl alcohol held at a temperature of 105–107° C. The reaction mixture was then heated at 107° C. for an additional 4.5 hours. The conversion of monomers to polymer was 60%. After removal of the unchanged monomers, the residual styrene/allyl alcohol/allyl glycidyl ether copolymer was dissolved in methyl ethyl ketone to give a solution having 40.4% solids and a viscosity of about 1 poise. The copolymer contained 8.3% allyl glycidyl ether and 7.5% allyl alcohol, based on hydroxyl number determination.

To 1895 parts of the above 40.4% solution of copolymer was added 695 parts of methyl ethyl ketone and 63.4 parts of 85% orthophosphoric acid. This solution was heated at reflux for one hour, then the solvent was removed under reduced pressure and the resulting polyphosphate was dissolved in xylene.

Films of this polyphosphate, when cured at 138° C. for 30 minutes, had excellent film properties including adhesion, hardness, flexibility and high gloss. Pigmented films had high gloss and excellent color, both initially and after heating at high temperatures up to 205° C.

Example XI

A mixture of 900 parts of styrene, 100 parts of glycidyl methacrylate and 20 parts of ditertiary-butyl peroxide was added to 1000 parts of xylene at 136–138° C. over a period of 4 hours. Refluxing was continued at this temperature for an additional 4 hours. There was obtained a 50% solution of a copolymer containing approximately 90% of styrene and 10% of glycidyl methacrylate.

To 1500 parts of this solution were added 51.4 parts of aqueous 85.4% $H_3PO_4$ in 990 parts of methyl isobutyl ketone. The $H_3PO_4$ was present in the proportion of 0.85 mole per mole of oxirane oxygen. The mixture was stirred for 1 hour at room temperature, and then heated for 1 hour at 65–75° C. The resulting solution of partially phosphated copolymer was clear and colorless and produced clear, adherent, and flexible coatings when baked on metal at 149° C. for 30 minutes.

Example XII

A copolymer containing approximately 80% styrene and 20% glycidyl methacrylate was prepared in a manner similar to the copolymerization described in Example XI.

To 20 parts of a 50% solution of this copolymer were added 20 parts of methyl isobutyl ketone and 0.8 part of aqueous 85.4% $H_3PO_4$ (0.5 mole per mole of oxirane oxygen). The reaction was completed at room temperature with agitation. The resulting solution of partially phosphated copolymer was similar in properties to the product of Example XI.

Example XIII

The product of Example XI was concentrated to 50% solids by vacuum distillation and the resulting solution was used to prepare the following pigmented coating composition:

| | Parts by weight |
|---|---|
| Product of Example XI (50% solution) | 400 |
| Titanium dioxide pigment | 160 |
| Methyl isobutyl ketone solvent | 80 |
| Petroleum hydrocarbon solvent | 100 |
| | 740 |

The ingredients were ground in conventional paint grinding equipment to produce a smooth uniform dispersion. An additional 117 parts of hydrocarbon solvent were added and intimately mixed therewith to thin the composition to spraying viscosity. The thinned composition was applied to a clean metal panel at a wet film thickness of about 2 mils by spraying. The panel was baked for 30 minutes at 149° C. The resulting coating was hard, adherent and flexible, and it protected the metal from rusting.

Example XIV

A vinyl toluene/allyl glycidyl ether copolymer was prepared as described in Example VIII except that the styrene was replaced by vinyl toluene (methylstyrene) which was a commercial mixture of methylstyrene isomers containing chiefly p-methylstyrene. The resulting vinyl toluene/allyl glycidyl ether copolymer contained 15.5% allyl glycidyl ether.

This copolymer was treated with phosphoric acid as described in Example VIII. Films from this polyphosphate had properties closely similar to those of the phosphated styrene/allyl glycidyl ether of Example VIII.

As starting material in the preparation of the polymeric phosphates of this invention, there can be used any polymeric epoxide which is a copolymer of styrene or vinyl toluene with a polymerizable, ethylenically unsaturated epoxy compound. Many unsaturated epoxy compounds have been previously described. In addition to the epoxy monomers shown in the examples, other suitable epoxy monomers which can be copolymerized with styrene include 4-vinylcyclohexene monoepoxide, 1,3-butadiene monoepoxide, glycidyl acrylate, vinyl glycidyl phthalate, allyl glycidyl maleate, allyl glycidyl phthalate, methallyl glycidyl ether, ally apha,beta-epoxy-isovalerate, and the like.

For best results, the copolymer should contain at least about 2% by weight of polymerized epoxy compound, since below that limit there are not enough epoxy groups to react effectively with the phosphoric acid, and preferably not more than about 65% of polymerized epoxy compound, since the polymerization of richer mixtures is often difficult to carry out and control, and the preparation of the phosphates also becomes very difficult to control without obtaining gelation. Furthermore, the economic aspects become disadvantageous with high proportions of epoxy compounds. Similarly, the preferred starting polymers contain between about 35% and 98% by weight of polymerized styrene. Within these limits, the copolymer may contain minor proportions, up to about 25% by weight, of other polymerized components. These are preferably polymers of vinylidene compounds, i. e., compounds having a terminal methylene group doubly bonded to adjacent carbon atom. Examples of such compounds are the vinyl halides, e. g., vinyl fluoride, vinyl chloride, vinylidene chloride; the vinyl esters of monocarboxylic acids, e. g., vinyl acetate, vinyl propionate; the acrylic and methacrylic acids, their esters, nitriles and amides, e. g., acrylic acid, methyl methacrylate, ethyl acrylate, acrylonitrile, methacrylonitrile, methacrylamide; the monounsaturated hydrocarbons having a terminal ethylenic double bond, e. g., ethylene, isobutylene; allyl alcohol, methyl vinyl ketone, and the like.

The preferred copolymers for use as starting materials are the styrene/glycidyl methacrylate copolymers. Outstanding results as regards corrosion-resistant coatings for metals are obtained with the phosphates of styrene/glycidyl methacrylate copolymers containing from 5 to 30% by weight of polymerized glycidyl methacrylate and 95 to 70% by weight of polymerized styrene. Other preferred starting materials are the styrene/allyl glycidyl ether copolymers, particularly those containing from 5 to 30% by weight of polymerized allyl glycidyl ether and 95 to 70% by weight of polymerized styrene.

Another way of expressing the chemical composition of the suitable copolymers from which the polymeric phosphates are prepared is in terms of oxirane oxygen content. To obtain the desired modification with phosphoric acid, the polymeric epoxide should contain at least 0.25% oxirane oxygen. Preferably, it contains at least 0.6% oxirane oxygen. The upper limit of oxirane oxygen content suitable to give useful, economical polymeric phosphates has been found to be about 8% by weight, and preferably 7%. The molecular weight of the starting polymers preferably ranges between about 1500 and about 10,000, but it can be as high as 50,000 or even higher.

The epoxide copolymers are prepared by free radical-initiated polymerization according to known methods and with known free radical-producing initiators. It is, of course, important to avoid conditions which would tend to open or otherwise destroy the epoxy groups, such as the presence of strong acids or bases. In order to produce copolymers of the desired composition, the monomers are in general used in relative amounts within the range of 5 to 75 parts of oxirane-containing unsaturate for 95 to 25 parts of styrene. It should be noted that some epoxy unsaturates, such as glycidyl methacrylate, polymerize at a rate comparable to that of styrene, but others, such as allyl glycidyl ether, polymerize much more slowly. In such cases, it is indicated to use much more of the epoxide in the monomer mixture than is required or to modify the conditions of copolymerization in order to obtain the desired copolymer composition.

As already stated, it is important to use at least 0.5 mole of phosphoric acid per oxirane oxygen in the preparation of the polymeric phosphates of this invention, since the use of smaller amounts tends to cause crosslinking and gelation of the polymeric epoxide. In most cases, there is used at least one mole of phosphoric acid per oxirane oxygen. The upper limit is not critical since the unreacted acid can readily be removed by washing with water, and there may be used as much as 15 moles, or even more, of phosphoric acid per oxirane oxygen. A satisfactory range of proportions is between 0.5 and 10 moles of phosphoric acid per oxirane oxygen. Partially phosphated polymers, that is, polymers reacted with less than one mole, e. g., 0.5 to 0.95 mole of phosphoric acid per oxirane oxygen, and therefore containing unreacted epoxide groups, are highly satisfactory from the standpoint of use in coating compositions. The polyphosphates so obtained produce coating compositions which may be cured at lower baking temperatures than the substantially completely phosphated products.

Orthophosphoric acid is the preferred agent because of its availability at low cost and of its easy reaction to give uniform products, but other acids of phosphorus such as meta-phosphoric and pyrophosphoric acids can be used. Likewise partially esterified phosphorus acids such as methyl acid phosphate or butyl acid phosphate can be used.

In order to minimize the possibility of crosslinking of the polymeric epoxide, it is preferred that the esterification reaction be carried out in a solution of the polymer in an organic solvent, which solvent should, of course, be substantially inert toward the epoxide linkages and the phosphoric acid. Such solvents are represented by the aromatic hydrocarbons, such as benzene, toluene, or the xylenes; aliphatic or aromatic ketones such as acetone, methyl ethyl ketone, cyclobutanone, acetophenone; acyclic or cyclic ethers such as di-n-butyl ether, dioxane, tetrahydrofurane, diphenylene oxide; aliphatic alcohols such as ethanol, n-butanol, isopropanol; and the like. Preferably, the solvent is one that is at least partly soluble in water to permit the use of aqueous solutions of phosphoric acid. The polymer solutions can be as dilute as desired, e. g., down to 1% concentration by weight, but it is in general unnecessary to use a concentration below 10%. The concentration can be as high as possible, e. g., up to 75%, a preferred range being 10 to 50% by weight. Under favorable conditions, for example, when a low molecular weight polymer rich in epoxide groups is used at low temperature, no solvent is necessary.

The esterification reaction can take place at a practical speed at any temperature above 0° C. It proceeds rather slowly at temperatures up to 30° C., and more rapidly at elevated temperatures which may be as high as 150° C. A particularly useful range of temperatures is 50° to 85° C. Within this range the reaction is, in general, substantially complete within a period of one-half to three hours.

The reaction product, i. e., the polymeric phosphate, is preferably isolated by adding sufficient water to the reaction mixture to precipitate the polymer or, if the latter is water-soluble, an aqueous solution of a salt such as sodium chloride, potassium sulfate, sodium phosphate, etc., can be used. The polymer is then washed with water or a salt solution to remove the excess phosphoric acid. With the partially phosphated materials, such a separation is not necessary. A coating composition may be prepared directly from the resulting solution.

The polymeric esters of phosphoric acid so obtained are resinous materials varying in consistency from viscous semi-solids to tough, moderately brittle, hard solids. Their molecular weights vary from about 1,500 to about 50,000 or higher, but are generally in the range of about 2,000 to about 10,000. These products are in general soluble in the same organic solvents in which the polymeric epoxides are soluble. They are sometimes soluble in water as such, or soluble in water containing sufficient alkali for partial or complete neutralization of the phosphoric acid groups. Such alkali may be an alkali metal hydroxide, e. g., sodium or potassium hydroxide, ammonia, or an alkylamine, preferably one containing 1 to 6 carbon atoms, such as methylamine, n-butylamine, diethylamine, triethylamine, ethanolamine, di-ethanolamine, cyclohexylamine, and the like. The polymeric phosphates also form salts with other metals such as copper, silver, zinc, aluminum, iron, nickel, cobalt, chromium, or manganese. Some of these salts, such as the zinc polyphosphates, are insoluble in water as neutral salts but are water-soluble as partially neutralized acid salts, and are also soluble in certain organic solvents. Other salts such as nickel and copper salts are soluble in water when combined with excess ammonia. This is presumably due to the formation of a metal-ammonia complex. The most useful of the salts are the water-soluble alkali metal, ammonium or substituted ammonium salts, and particularly the ammonium salts.

Some of the polymeric phosphates of this invention, however, are not soluble in either water or dilute aqueous alkali as ammonium hydroxide, although they are readily soluble in organic solvents. These alkali-insoluble polyphosphates are, in general, those prepared from epoxy copolymers containing above about 70%, i. e., from 70 to 98% by weight of polymerized styrene and from 30 to 2% by weight of the polymerized ethylenically unsaturated epoxy compound. It is also probable that compositional homogeneity has a bearing on the alkali-solubility of the polyphosphates. Thus, because of the widely differing relative rates of copolymerization of styrene and allyl glycidyl ether, batch copolymerization of styrene and allyl glycidyl ether mixtures high in styrene content leads to a product which contains polymer ranging in composition from nearly pure polystyrene to nearly pure polymerized allyl glycidyl ether. This results from the change in monomer composition as the polymerization progresses. Such a product is less likely to lead to alkali-soluble polyphosphates than one prepared under constant environment techniques designed so that the styrene monomer is added as needed during the polymerization to maintain any desired styrene/allyl glycidyl ether ratio at the site of polymerization. Moreover, as already indicated, alkali-solubility is influenced by the extent of phosphation, in that polymers containing large amounts of phosphate groups, for example, completely or substantially completely phosphated products derived from polymers containing a high proportion of oxirane oxygen tend to be more soluble than those containing fewer phosphate groups, such as incompletely phosphated epoxy copolymers or completely phosphated products derived from copolymers containing a low proportion of oxirane oxygen.

The polymeric phosphates of this invention are outstandingly useful as ingredients of coating compositions, which can be clear or pigmented. Clear compositions can be prepared with any suitable organic solvent, such as acetone, methyl isobutyl ketone, n-butyl alcohol and the like. A wide variety of pigments commonly used in organic coating compositions can be incorporated, including titanium dioxide, carbon black, iron blues, phthalocyanine blues and greens, metal oxides and chromates, organic maroons, and various inert extenders such as talc, barytes and china clay. Other film-forming materials, which are compatible with the polyphosphates of this invention and which are soluble in the same solvents, may be blended with polyphosphate solutions to produce clear or pigmented coating compositions. Examples of such film-forming materials are urea-formaldehyde resins, melamine-formaldehyde resins, alkyd resins and other natural and synthetic polymers.

The alkali-insoluble polyphosphates of this invention have outstanding usefulness as metal coatings, due to the combination of excellent physical properties (e. g., adhesion, craze resistance) and remarkable chemical inertness which they possess after curing at elevated temperature.

The heat-curing or thermosetting of these polyphosphates can be carried out simply by means of a heat treatment at temperatures between about 120° C. and 250° C. for periods varying, depending on the temperature, between 10 and 45 minutes. Small amounts, from 0.1 to 5% by weight, of curing or thermosetting agents may be admixed with the polymer, such agents being preferably organic solvent-soluble urea-formaldehyde or melamine-formaldehyde resins, which may be used as such or in conjunction with an acidic catalyst. With the help of such agents, it is possible to insolubilize the resins at lower temperatures, for example, by heating at 100–175° C. for 10–30 minutes, or, alternatively, at higher temperatures such as 140–250° C. but for shorter periods of time. After complete curing, the polyphosphates are insoluble in and unaffected by the common organic solvents, water, aqueous alkali, or aqueous acid, and they are infusible.

The alkali-soluble polyphosphates of this invention also have many important industrial applications. For example, they are useful in the sizing of fibers of the polyester type, e. g., polyethylene terephthalate, and in the treatment of leather. Other uses are illustrated by the fact that the already mentioned metal salts (e. g., copper or nickel), which can be water-solubilized by means of ammonia, may be applied to substrates from aqueous solutions. On air-drying, the residual films evolve ammonia and gradually become insoluble in and insensitive to water. Curing at elevated temperatures, e. g., 80–150° C., increases the rate of insolubilization. Films or coatings of water-soluble polyphosphate salts such as those of aluminum or chromium may be prepared in situ by impregnating substrates such as paper, textiles, wood, leather, or ceramics with a water-soluble salt of these metals and subsequently treating the impregnated substrate with a soluble ammonium or alkali metal polyphosphate. Alternatively, the substrate may be impregnated first with the polyphosphate and then treated with a suitable inorganic salt. This treatment forms the insoluble metal polyphosphate within the pores or fibers of the substrate. Thus there can be obtained coatings or films having certain special properties such as improved body or stiffness, increased stability and durability, increased flame-resistance, etc.

Polyphosphate salts of metals such as copper or mercury have bactericidal and fungicidal properties and are useful as spreader-sticker or anchoring agents for insecticides, insect-repellents, herbicidal compositions, and preservatives for wood or textiles.

The soluble polymeric phosphates of this invention are compatible to a considerable extent with colloidal silica sols and such compositions are useful in adhesives, finishes, and dispersed systems such as polymer dispersions and wax dispersions.

Aqueous solutions of ammonium, amine, or alkali metal polyphosphates are useful as clear finishes for wood, glass ceramics, textiles, paper, metals, and other substrates and may be used either as primer-sealer coats for subsequent application of other finishes or as the total protective or decorative finish for these substrates. Salts such as cupric ammonium polyphosphates are especially useful for sealing wood, textile, and paper surfaces since the salt becomes insensitive to water on drying and also imparts a preservative action to such cellulosic substrate surfaces.

Aqueous solutions of low molecular weight, soluble polyphosphates show surface active properties and can be used as dispersing agents in preparing oil or paint emulsions and in polymerizing ethylenically unsaturated compounds in aqueous systems. They are especially useful as pigment dispersing agents and pigment binders in the preparation of water paints and pigment printing compositions. They are also useful as lime sequestering agents, detergents, and detergent assistants.

There are other methods, besides the phosphoric acid treatment followed by heating, of preparing insoluble and infusible coatings based on styrene/unsaturated epoxide copolymers. For example, the styrene/unsaturated epoxide copolymer may be intimately mixed with a polyamine in such proportions that there is present between about 0.2 and 1.0 amino group per oxirane oxygen, and the mixture is then baked for 20-40 minutes at a temperature of 90–150° C. Suitable diamines for this purpose include, for example, m-phenylenediamine, p,p'-diaminodiphenylmethane, diacetone diamine, bis-p-aminocyclohexyl)methane, p - xylylenediamine, tripropylene tetramine, tetraethylene pentamine, 3,3'-diaminodipropyl ether, and the like. The cured films so obtained have good resistance to organic solvents and good physical properties. However, they are not as satisfactory in these respects as the films from polyphosphates of styrene/unsaturated epoxide copolymers.

As many apparently widely different embodiments of this invention may be made without departing from the spirit and scope thereof, it is to be understood that this invention is not limited to the specific embodiments thereof except as defined in the appended claims.

I claim:

1. A polymeric material selected from the class consisting of polymeric phosphates and their salts, said polymeric phosphates being the reaction product of a polymeric epoxide copolymer having a molecular weight of at least 1500 with phosphoric acid in amount of at least one-half mole per oxirane oxygen atom in said copolymer, said polymeric epoxide copolymer containing from 2 to 65% by weight of a polymerized ethylenically unsaturated epoxy monomer and from 98 to 35% by weight of a polymerized styrene monomer.

2. A polymeric material as set forth in claim 1 wherein said polymeric phosphates are the reaction product of said polymeric epoxide copolymer with phosphoric acid in amount of at least one mole per oxirane oxygen atom in said copolymer.

3. A polymeric phosphate which is the reaction product of a polymeric epoxide copolymer having a molecular weight of at least 1500 with phosphoric acid in amount of at least one-half mole per oxirane oxygen atom in said copolymer, said polymeric epoxide copolymer containing from 2 to 65% by weight of a polymerized ethylenically unsaturated epoxy monomer and from 98 to 35% by weight of a polymerized styrene monomer.

4. A clear coating composition comprising a solvent and as a film-forming material in solution therein a polymeric phosphate as set forth in claim 3.

5. A pigmented coating composition comprising a pigment, a solvent and as a film-forming material in solution therein a polymeric phosphate as set forth in claim 3.

6. A polymeric phosphate as set forth in claim 3 wherein said polymeric phosphate is the reaction product of said polymeric epoxide copolymer with phosphoric acid in amount of at least one mole per oxirane oxygen atom in said copolymer.

7. A polymeric material selected from the class consisting of polymeric phosphates and their salts, said polymeric phosphates containing unreacted epoxy groups and being the reaction product of a polymeric epoxide copolymer having a molecular weight of at least 1500 with phosphoric acid in amount of at least one-half mole per oxirane oxygen atom in said copolymer, said polymeric epoxide copolymer containing from 2 to 30% by weight of a polymerized ethylenically unsaturated epoxy monomer and from 98 to 70% by weight of a polymerized styrene monomer.

8. A polymeric phosphate which is the reaction product of a polymeric epoxide copolymer having a molecular weight of at least 1500 with phosphoric acid in amount of at least one-half mole per oxirane oxygen atom in said copolymer, said polymeric epoxide copolymer containing from 2 to 65% by weight of polymerized allyl glycidyl ether and from 98 to 35% by weight of polymerized styrene.

9. A polymeric phosphate as set forth in claim 8 wherein said polymeric phosphate is the reaction product of said polymeric epoxide copolymer with phosphoric acid in amount of at least one mole per oxirane oxygen atom in said copolymer.

10. A polymeric phosphate as set forth in claim 8 wherein said polymeric epoxide copolymer contains from 5 to 30% by weight of polymerized allyl glycidyl ether and from 95 to 70% by weight of polymerized styrene.

11. A polymeric phosphate which is the reaction product of a polymeric epoxide copolymer having a molecular weight of at least 1500 with phosphoric acid in amount of at least one-half mole per oxirane oxygen atom in said copolymer, said polymeric epoxide copolymer containing from 2 to 65% by weight of polymerized glycidyl methacrylate and from 98 to 35% by weight of polymerized styrene.

12. A polymeric phosphate as set forth in claim 11 wherein said polymeric phosphate is the reaction product of said polymeric epoxide copolymer with phosphoric acid in amount of at least one mole per oxirane oxygen atom in said copolymer.

13. A polymeric phosphate as set forth in claim 11 wherein said polymeric epoxide copolymer contains from 5 to 30% by weight of polymerized glycidyl methacrylate and from 95 to 70% by weight of polymerized styrene.

No references cited.